Figure 1:
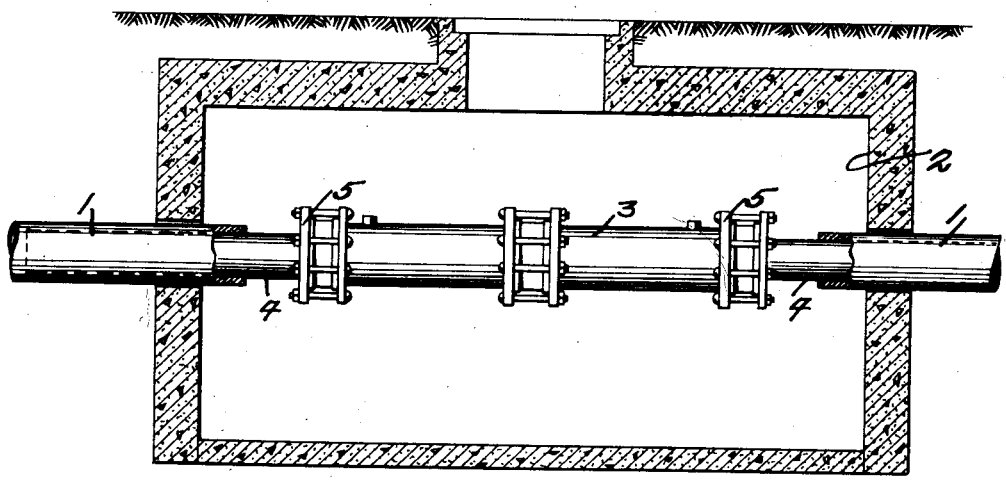

Nov. 16, 1937.                C. E. BENNETT                2,099,291
                          ELECTRIC CABLE SYSTEM
                            Filed May 14, 1936

INVENTOR
Charles E. Bennett
BY
Kiddle, Bechtel and Montgomery
ATTORNEYS

Patented Nov. 16, 1937

2,099,291

UNITED STATES PATENT OFFICE 2,099,291

ELECTRIC CABLE SYSTEM

Charles E. Bennett, Ridgewood, N. J., assignor to The Okonite-Callender Cable Company, Incorporated, Paterson, N. J., a corporation of New Jersey Application May 14, 1936, Serial No. 79,733

4 Claims. (Cl. 247—3)

This invention relates to underground electric power cable systems and is primarily directed to the provision of a new and novel joint structure for cable systems of the type wherein the sheathed cable is enclosed within an outer casing which may be an existing conduit, or may be a casing or tubing of non-corrosive material such as transite, the sheath of the cable being expanded finally, by internal pressure, to the inside diameter of the enclosing casing.

According to the present invention I propose to have the metal sleeve or casing of the joint extend into the conduit, between the conduit or outer casing of the cable and the sheath of the cable. When the cable sheath is expanded to the internal diameter of the outer casing or conduit it will be appreciated that the joint sleeve will be united to the conduit.

Figure 2:
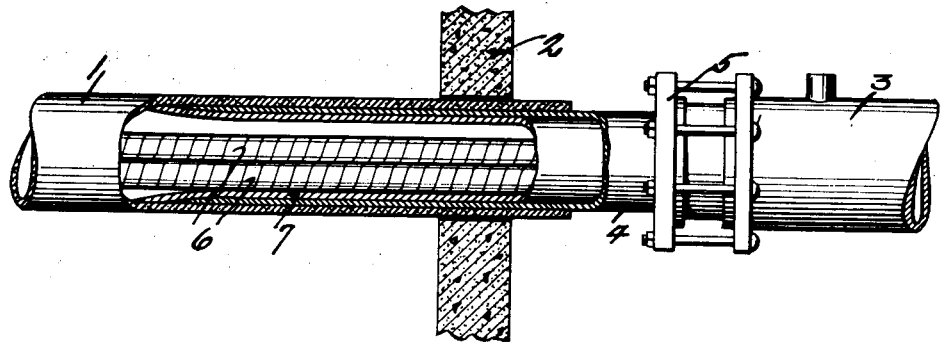

In the drawing:

Fig. 1 is a fragmentary sectional elevational view of an embodiment of my invention; and Fig. 2 is a sectional elevational view with parts broken away to show internal construction.

As above mentioned the present invention relates primarily to joints for electric cable systems wherein a sheathed cable is enclosed in an outer casing, the sheath thereafter being expanded by fluid pressure to the internal diameter of the outer casing. In the drawing of the present application I designates the outer casing of the cable system. I want it clearly understood that this outer casing may be an existing conduit or it may be a tube of transite or other material which is not deleteriously affected by conditions of the earth in which the system is buried.

2 designates a manhole in which the joint is to be made up.

The joint comprises a joint casing 3 which may be of usual construction, so far as the present invention is concerned, the casing, however, being provided at each end with a metal sleeve 4 secured to the joint casing by suitable couplings 5.

The joint casing is split midway of its length so that the two sections of the casing may be moved to one side, to permit of splicing the cable.

The cable comprises insulated conductors 6 enclosed in a metal sheath 7 of lead, for example, and in installing the cable the assembly is enclosed in the outer casing I, and the two halves of the joint casing slipped over the adjacent ends of two cable sections to be joined.

In this operation the outer end of each of the joint sleeves 4 is slipped into the ends of the outer casing I, between the casing and the cable sheath 7. After the cables are spliced and the joint finished, then oil or other suitable fluid is pumped into the cable sheath, causing the sheath to expand into contact with the inside wall of the outer casing I and with the joint sleeves. In this operation it will be quite apparent that the sleeves 4 of the joint casing will be united, by the expanding sheath to the outer casing I, as illustrated in Fig. 2.

It will be seen from all of the foregoing that the present invention provides an extremely simple and efficient way of making up cable joints. I wish it to be understood, however, that changes may be made in the details of construction and arrangement of parts hereinabove described without departing from the spirit and scope of my invention.

What I claim is:—

1. An electric cable system comprising in combination a plurality of sheathed cable sections, an outer enclosure for the cable sections, a joint for the cable sections comprising an enclosing joint casing, the outer ends of the joint casing extending into the said outer enclosure and the cable sheath being expanded to unite the joint casing and said outer enclosure.

2. An electric cable system comprising in combination a plurality of sheathed cable sections, an outer enclosure for the cable sections, a joint for the cable sections comprising an enclosing joint casing, the outer ends of the joint casing extending into the said outer enclosure, between the cable sheath and the enclosure, and fluid under pressure filling the cable sheath and expanding the cable sheath so as to unite the joint casing and the outer enclosure.

3. An electric cable system comprising in combination a plurality of sheathed cable sections, an outer enclosure for each section, said enclosures terminating short of each other, a joint casing between the adjacent ends of said enclosures and receiving the adjacent ends of the cable sections, a sleeve at each end of the joint casing extending into the said enclosures, said sleeves surrounding the sheath of the cable sections, and a fluid filling the cable sheaths, said fluid being under pressure to cause an expansion of the cable sheaths to unite the casing sleeves and the outer enclosures.

4. The process which comprises placing two sheathed cable sections within adjacent sections of an outer enclosure, jointing the adjacent ends of the cable sections, the ends of the joint casing being inserted in the adjacent ends of the said outer enclosure, between the sheath of the cable sections and the outer enclosure sections, and then expanding by internal fluid pressure the cable sheaths to the outer enclosure and to the joint casing ends to unite the said outer enclosure and the joint casing.

CHARLES E. BENNETT.